(12) United States Patent
Starovoitov et al.

(10) Patent No.: US 9,436,716 B2
(45) Date of Patent: **\*Sep. 6, 2016**

(54) METHOD AND SYSTEM FOR DATA PLANE ABSTRACTION TO ENABLE A NETWORK STORAGE PLATFORM ECOSYSTEM

(71) Applicant: PLUMgrid, Inc., Sunnyvale, CA (US)

(72) Inventors: Alexei Starovoitov, Los Gatos, CA (US); Sushil Singh, Mountain View, CA (US); Pere Monclus, San Jose, CA (US); Awais Nemat, San Jose, CA (US)

(73) Assignee: PLUMGRID, INC., Sunnyvale, CA (US)

( * ) Notice: Subject to any disclaimer, the term of this patent is extended or adjusted under 35 U.S.C. 154(b) by 549 days.

This patent is subject to a terminal disclaimer.

(21) Appl. No.: 13/888,534

(22) Filed: May 7, 2013

(65) Prior Publication Data

US 2014/0337391 A1    Nov. 13, 2014

(51) Int. Cl.
    *G06F 7/00*       (2006.01)
    *G06F 17/30*      (2006.01)
    *G06F 3/06*       (2006.01)

(52) U.S. Cl.
    CPC ....... *G06F 17/30312* (2013.01); *G06F 3/0604* (2013.01); *G06F 3/067* (2013.01); *G06F 3/0631* (2013.01)

(58) Field of Classification Search
    CPC .................. G06F 9/45533; G06F 9/45558
    USPC ......... 707/803, 812, 790; 713/153; 370/252, 370/392; 709/220; 711/118
    See application file for complete search history.

(56) References Cited

U.S. PATENT DOCUMENTS

| 5,860,138 | A | * | 1/1999 | Engebretsen | ......... G06F 9/3013 711/118 |
| 7,822,875 | B1 | * | 10/2010 | Hutchison | ............... H04L 69/22 370/392 |
| 8,595,787 | B2 | * | 11/2013 | Riley | .................. H04L 12/5695 726/1 |
| 2003/0033519 | A1 | * | 2/2003 | Buckman | ............ H04L 67/2823 713/153 |
| 2011/0085461 | A1 | * | 4/2011 | Liu | .......................... H04L 43/12 370/252 |
| 2012/0254567 | A1 | * | 10/2012 | Umbehocker | ........ G06F 3/0604 711/162 |
| 2013/0132533 | A1 | * | 5/2013 | Padmanabhan | ..... H04L 41/0823 709/220 |
| 2014/0020083 | A1 | * | 1/2014 | Fetik | ...................... G06F 21/552 726/11 |
| 2014/0115579 | A1 | * | 4/2014 | Kong | ...................... G06F 9/455 718/1 |

\* cited by examiner

*Primary Examiner* — Cheyne D Ly
(74) *Attorney, Agent, or Firm* — Edward J. Lenart; Kennedy Lenart Spraggins LLP

(57) ABSTRACT

A method for network storage by receiving, by a storage compiler, a first storage definition from a storage application developer, where the first storage definition describes a customized storage implementation for storing data in an abstraction of at least one physical storage device, compiling the first storage definition to generate a first customized storage implementation module, and loading the first customized storage implementation module into an IO engine. The first customized storage implementation module causes data to be stored in the at least one physical storage device differently than prior to loading the first customized storage implementation module in the IO engine.

17 Claims, 9 Drawing Sheets

METHOD AND SYSTEM FOR DATA PLANE ABSTRACTION TO ENABLE A NETWORK STORAGE PLATFORM ECOSYSTEM

BACKGROUND

Since the inception of computer networks, the size of networks has grown exponentially. Today, any number of computing devices may be connected over a network, and data and services provided by those devices may be accessed from any number of locations. With that growth, the complexity of managing storage solutions across networks has increased.

In non-virtualized computing devices, the files are accessed either via distributed file system like NFA or SAMBA/CIFS or via locally attached block device with its own file system. Virtualization trend in compute and networking require storage virtualization where different solutions are sometimes called Software Defined Storage. SDS could offer coarse-grained bottom-up abstractions (box, volume, LUN, filesystem) vs. fine-grained top-down abstractions for data management (virtual machines, virtual disks) required for a multi-tenant cloud environment. SDS is a part of the broader software-defined data center concept wherein all the virtualized storage, server, networking and security resources required by an application can be defined by software and provisioned automatically.

SUMMARY

In general, in one aspect, the invention relates to a method for network storage by receiving, by a storage compiler, a first storage definition from a storage application developer, where the first storage definition describes a customized storage implementation for storing data in an abstraction of at least one physical storage device, compiling the first storage definition to generate a first customized storage implementation module, and loading the first customized storage implementation module into a IO engine. The first customized storage implementation module causes data to be stored in the at least one physical storage device differently than prior to loading the first customized storage implementation module in the IO engine.

In general, in one aspect, the invention relates to a system for network storage. The system includes a computer readable storage device including computer readable code executable by a processor to receive, by a storage compiler, a first storage definition from a storage application developer, where the first storage definition describes a customized storage implementation for storing data in an abstraction of at least one physical storage device. The computer readable code is further executable by the processor to compile the first storage definition to generate a first customized storage implementation module, and load the first customized storage implementation module into a IO engine. The first customized storage implementation module causes data to be stored in the at least one physical storage device differently than prior to loading the first customized storage implementation module in the IO engine.

In general, in one aspect, the invention relates to a computer program product for network storage application development. The computer program product includes a computer readable storage device and computer readable code stored on the computer readable storage device and executable by a computer processor to receive, by a storage compiler, a first storage definition from a storage application developer, where the first storage definition describes a customized storage implementation for storing data in an abstraction of at least one physical storage device. The computer readable code is further executable by the processor to compile the first storage definition to generate a first customized storage implementation module, and load the first customized storage implementation module into an IO engine. The first customized storage implementation module causes data to be stored in the at least one physical storage device differently than prior to loading the first customized storage implementation module in the IO engine.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

DETAILED DESCRIPTION

Figure 1:
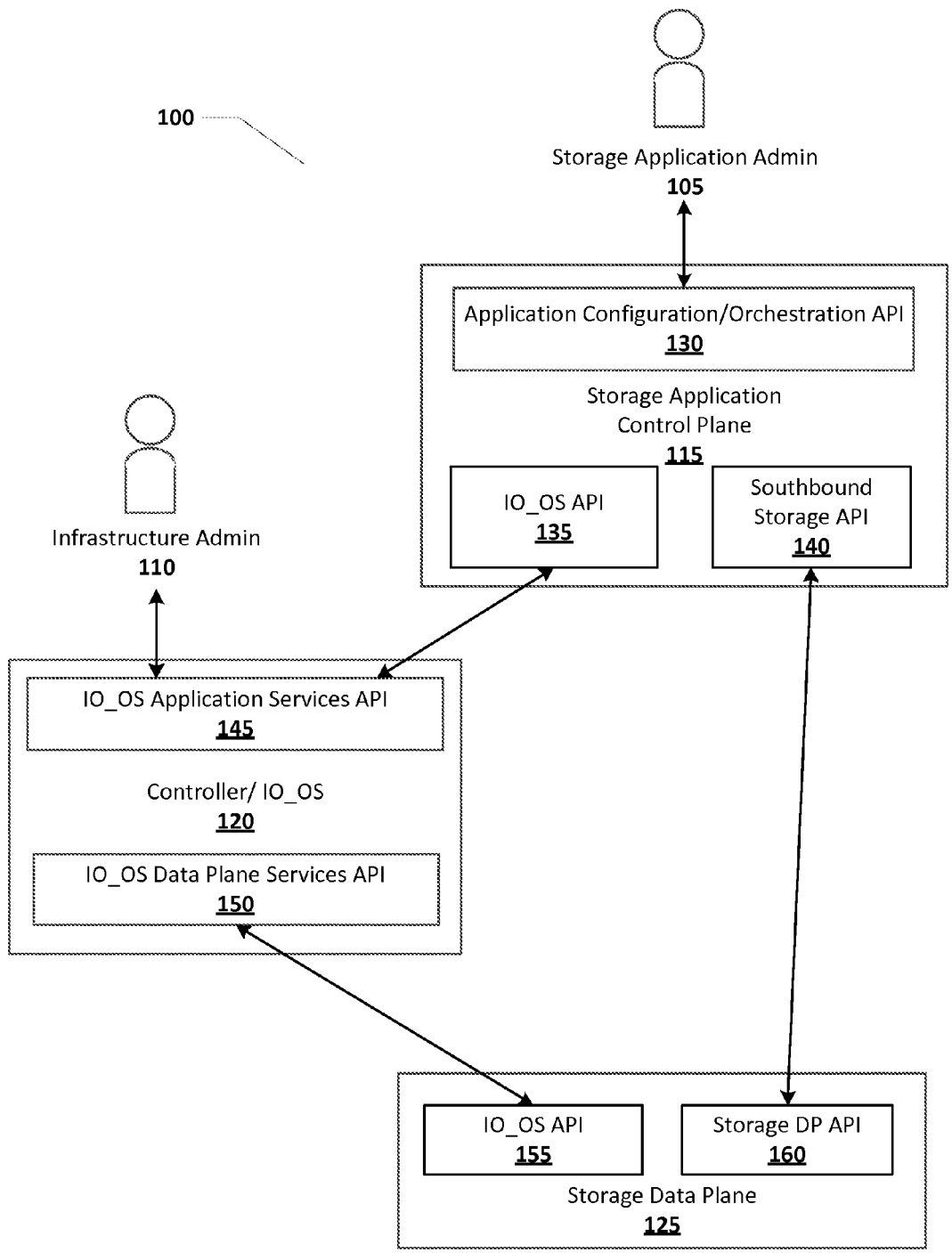
FIG. 1 shows a networking storage architecture, in which the invention may be practiced, according to one or more embodiments.

In the following detailed description of exemplary embodiments of the invention, specific exemplary embodiments in which the invention may be practiced are described in sufficient detail to enable those skilled in the art to practice the invention. The following detailed description is, therefore, not to be taken in a limiting sense, and the scope of the present invention is defined by the appended claims and equivalents thereof.

The terminology used herein is intended to describe particular embodiments only and is not intended to be limiting of the invention. As used herein, the singular forms "a", "an" and "the" are intended to include the plural forms as well, unless otherwise indicated. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by executable computer program instructions (or computer code). These computer program instructions may be provided to a processor of a general purpose computer, special purpose computer, or other programmable data processing apparatus to produce a machine, such that the instructions, which execute via the processor of the computer or other programmable data processing apparatus, implement the methods/processes/functions/acts specified in the one or more blocks of the flowchart(s) and/or block diagram(s).

These computer program instructions may also be stored in a tangible computer readable storage device that can direct a computer to function in a particular manner, such that the computer readable storage device is an article of manufacture (or computer program product) including instructions which implement the method/process/function/act specified in the one or more blocks of the flowchart(s) and/or block diagram(s). The computer program instructions may also be loaded onto a computer, other programmable data processing apparatus, or other devices to cause a series of operational steps to be performed on the computer, other programmable apparatus or other devices to produce a computer implemented process/method, such that the instructions which execute on the computer or other programmable apparatus implement the method/process/functions/acts specified in one or more blocks of the flowchart(s) and/or block diagram(s).

It is understood that the use of specific component, device and/or parameter names (such as those of the executing utility/logic described herein) are for example only and not meant to imply any limitations on the invention. The invention may thus be implemented with different nomenclature/terminology utilized to describe the components, devices, or parameters herein, without limitation. Each term utilized herein is to be given its broadest interpretation given the context in which that terms is utilized.

Generally, the description is directed to a method for customizable network storage. More specifically, the invention is directed to a method for extending the I/O engine to create distributed storage functions. A customizable module is generated and deployed in the data plane such that virtual storage is modified based on the particularities of the module. Thus, two network applications accessing a data plane container containing two different customizable storage implementation modules will treat virtual network storage differently.

Turning to the figures, FIG. 1 depicts a software defined storage architecture, in which the invention may be practiced, according to one or more embodiments. Specifically, FIG. 1 depicts a network storage environment in which one or more storage administrators may manage network storage applications (also referred to herein as storage applications), according to one or more embodiments. As depicted, the network storage includes a storage application control plane 115, an IO operating system (IO_OS, or controller) 120, and a storage data plane 125. Each of storage control plane 115, storage data plane 125, and IO_OS 120 may be stored across one or more computing devices including one or more of a computer processor, memory, and a computer readable storage device including computer code executable by the computer processor. Memory may be random access memory (RAM), cache memory, flash memory, or any other kind of storage structure or device that is configured to store computer instructions/code executable by a computer processor to store data utilized during such execution. The computer readable storage device may be any kind of computer storage device, volatile or non-volatile, such as a hard disk, an optical drive such as a compact disk drive or digital video disk (DVD) drive, and a flash memory drive.

In one or more embodiments, the storage application control plane 115 of the storage application includes an application configuration/orchestration API 130, an IO operating system (IO_OS) API 135, and a southbound storage API 140. Each of orchestration API 130, IO_OS API 135, and southbound storage API 140 is a programmatic interface that includes computer code executable by a computer processor to allow users or external modules to interoperate with the storage application control plane 115. Specifically, orchestration API 130 allows a user or other management module to communicate with storage application control plane 115. IO_OS API 135 is a programmatic interface that includes computer code that allows the storage application control plane 115 to communicably connect to an IO operating system 135. Southbound storage API 140 is a programmatic interface that allows the control plane to communicate with the storage data plane 125 in order to control the behavior of storage data plane 125.

In one or more embodiments, IO_OS 120 includes an IO_OS application services API 145 and an IO_OS data plane services API 150. IO_OS application services API is a programmatic interface that interacts with IO_OS API 135 to allow IO_OS 125 to communicate with storage application control plane 115. In addition, in one or more embodiments, IO_OS application services API 145 receives instruction from an infrastructure administrator 110, or other management module in the system. IO_OS data plane services API 150 is a programmatic interface that allows IO_OS 120 to communicate with storage data plane 125.

As depicted, storage data plane 125 includes IO_OS API 155 and storage data plane API (storage DP API) 160. In one or more embodiments, IO_OS API 155 is a programmatic interface that allows IO_OS 120 to communicate with storage data plane 125 via IO_OS data plane services API 150. Storage DP API 160 is a programmatic interface that allows storage data plane 125 to receive management instructions from storage application control plane 115 via southbound storage API 140.

Each of the storage application control plane 115, storage data plane 125, and IO_OS 120 may be managed by one or more human, mechanical, or computational administrators. As depicted, storage application admin 105 manages the storage application control plane 115, while infrastructure admin 110 manages IO_OS 120. However, those skilled in the art will appreciate that any of storage application admin 105 and infrastructure admin 110 may be replaced by a single entity, or one or more computing modules.

According to one or more embodiments, the system depicted in FIG. 1 allows for the instantiation of multiple concurrent network storage applications, although for purposes of clarity, FIG. 1 depicts only a single instantiation of a Network Storage Application. The communicable linkage between the southbound storage API 140 of the storage application control plane 115, and the storage data plane API 160, allows communication from the storage application control plane 115 to bypass to IO_OS 120 and communicate directly with the storage data plane 125.

Figure 2:
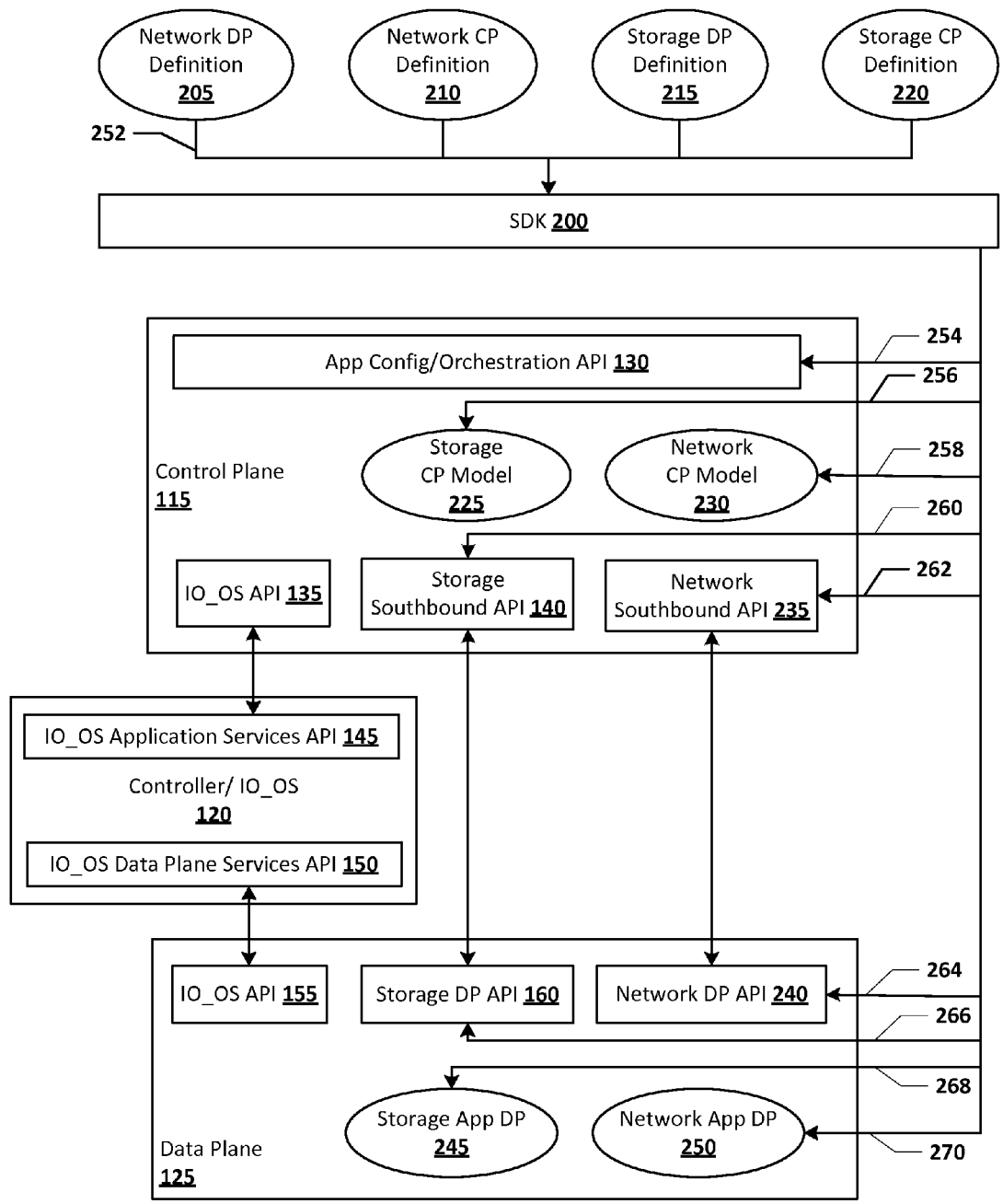
FIG. 2 shows a detailed network storage architecture in which the invention may be practiced, according to one or more embodiments.

FIG. 2 shows a flow diagram in a detailed IO architecture in which the invention may be practiced, according to one or more embodiments. Specifically, FIG. 2 includes the control plane 115, IO_OS 120, and data plane 125 components from FIG. 1, but illustrates with more specificity the development process of the IO architecture, and also includes components used in generating a customizable network infrastructure. According to one or more embodiment, the infrastructure depicted in FIG. 2 illustrates how a software development kit (SDK) 200 may be utilized in order to customize a software-defined network and storage environment.

According to one or more embodiments, the customizable IO environment eliminates the hard link between control plane, and data plane. The customizable IO environment allows for better scalability, and prevents architecture gridlock so that individual components (such as control plane or data plane) may be modified independently, as needed. In addition, the customized IO architecture enables a third party developer to modify preexisting functional components of an IO operating system.

Further, according to one or more embodiments, customized storage implementations, allow great deal of flexibility in defining and implementing a control plane and data plane of storage applications. For example, a storage application can provide an illusion of a locally attached block device to virtual machine whereas the physical counterpart of virtual block device may be present on a remote machine as, for example, a hard drive or flash drive, or may be present in memory only. Another storage application may provide on the fly encryption of blocks before they are transmitted over the network. Yet another application may be responsible for data deduplication logic and other forms of caching.

As depicted in FIG. 2, an SDK 200 may be utilized to generate a set of new storage applications not previously envisioned when the data plane container 125 or IO_OS 120 were created. SDK 100 includes computer readable code executable by a computer processor to provide a development tool that allows the development of a particular application, including generating customized IO environment and modules to provide customized storage implementations. SDK 200 may be a set of tools, compilers, workflows and programmatic interface, such as an application program interface (API), or a more complete development environment to allow for generation of network applications. The flow of data is enumerated within FIG. 2. However, the order each data flow is marked does not necessarily indicate the order in which data flows throughout the system.

At 252, SDK receives or generates user-defined network data plane definition 205 and storage data plane definition 215, as well as network control plane definition 210 and storage control plane definition 220 for a particular IO storage network application. Although FIG. 2 depicts network DP definition 205, network CP definition 210, storage DP definition 215, and storage CP definition 220 as being handled by a single instance of SDK 200, network DP definition 205, network CP definition 210, storage DP definition 215, and storage CP definition 220 may be generated on separate instances of SDK 200, and even by separate parties on separate computing devices across a distributed computing environment or network. According to one or more embodiments, network DP definition 205, network CP definition 210, storage DP definition 215, and storage CP definition 220 are generated in a domain specific language.

According to one or more embodiments, network DP definition 205 and storage DP definition 210 describe a customized functionality of a data plane of an IO storage application. In one or more embodiments, SDK 200 process network DP definition 205 to generate network DP API 240 and customized network application data processing module 250. At 264, SDK 200 deploys network DP API 240 into data plane 125, and at 270, SDK 200 deploys customized network application data processing module 250 into data plane 125. In one or more embodiments, SDK 200 process storage DP definition 215 to generate storage DP API 160 and customized storage application data processing module 245. At 266, SDK 200 deploys storage DP API 160 into data plane 125, and at 268, SDK 200 deploys customized network application data processing module 250 into data plane 125.

In one or more embodiments, customized storage implementation module 222 causes the data plane 125 to process block device read/write access differently than it would prior to loading customized storage implementation module 222. Thus, a network storage application associated with a first customized storage implementation module would have a different view of physical storage devices than a network storage application associated with a second customized storage implementation module in the same data plane. In one or more embodiments, customized network application data processing modules are configured to perform functions configurable by a developer. Those functions may include, for example, parse, lookup, update, and modify. According to one or more embodiments, the function of parse determines a structure of an incoming block of data into the data plane. According to one or more embodiments, the function of lookup identifies a set of relevant rules for a specific packet from a set of tables. According to one or more embodiments, the function of update includes modifying an internal state of the data processing module based on the combination of rules extracted from the lookup state and the incoming packet. According to one or more embodiments, the function of modify includes a set of rewrite capabilities to generate new headers of blocks of data that will be sent out of the data processing module.

According to one or more embodiments, network storage DP definition 215 describes a customized storage implementation for network storage. According to one or more embodiments, network storage DP definition 215 describes a particular implementation of virtual abstractions of physical block devices. Customized storage application data processing module 245 causes the data plane 125 to store packets differently than it would prior to loading customized network application data processing module 245. In one or more embodiments, customized storage application data processing modules are configured to perform functions configurable by a developer. Those functions may include, for example, hash, encrypt, decrypt, lookup, and data deduplication. The configurable function of hash includes a hash function that maps data sets. The configurable function of encrypt includes a function for encoding data using an encryption algorithm. The configurable function of decrypt comprises a function for encoding data using an encryption algorithm. The configurable function of lookup includes identifying a location for particular data. The configurable function of deduplication includes functionality for removing redundant data.

According to one or more embodiments, network CP definition 210 and storage CP definition 220 include uncompiled computer code for object models of the control plane for the particular network application. In one or more embodiments, SDK 200 processes network CP definition 210 to generate a compiled network control plane object model 230, as well as network southbound API 235 and application configuration/orchestration API 130. At 254, SDK 200 deploys the orchestration API 130 into the control plane. At 258, SDK 200 deploys network CP object model 230 into control plane 115. At 262, SDK 200 deploys the network southbound API 235 into control plane 115.

In one or more embodiments, SDK 200 processes storage CP definition 220 to generate a compiled storage control plane object model 225, as well as storage southbound API 140. At 256, SDK 200 deploys the storage CP object model 225 into control plane 115. At 262, SDK 200 deploys the storage southbound API 140 into control plane 115.

In one or more embodiments, the various components of the control plane 115 and data plane 125 of a particular IO application need to be linked. The link may be generated by SDK 200 as part of processing either network DP definition 205 and storage DP definition 210 or network CP definition 210 and storage CP definition 220. Alternatively, the link between the various components may be generated separately from the control plane and data plane components, and may be generated by a third party that did not generate either the control plane or data plane components. As depicted, the linked code allows the storage southbound API 140 and storage DP API 160 to become communicably connected. In addition, it allows the network southbound API 235 and network DP API 240 to be communicably connected.

In one or more embodiments, the linkage between the control plane 115 and the data plane 125 prevents the control plane 115 of a particular IO application to interact with the data plane of another network or storage application. Thus, the control plane of a first IO application and the control plane of a second IO application may concurrently communicate with a single data plane container to access their respective customized data processing modules. In one or more embodiments, the separation between each IO application's control plane and corresponding data plane is enforced by the instructions that IO_OS 120 applies to data plane 125.

Figure 3:
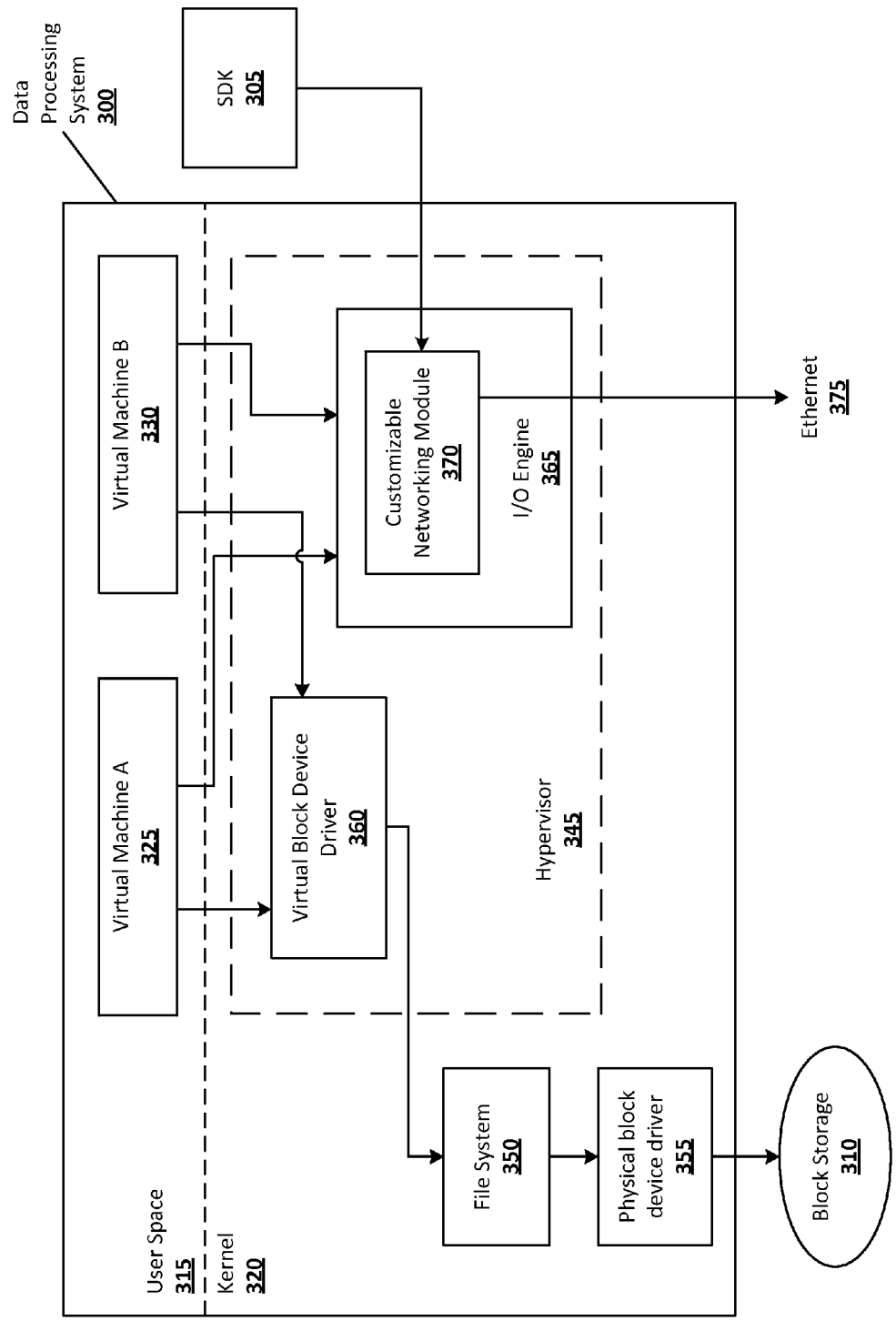
FIG. 3 shows a data processing system, in which the invention may be practiced, according to one or more embodiments.

FIG. 3 shows a data processing system well understood in the networking world. Specifically, FIG. 3 depicts a current system for implementing a customizable network. Those skilled in the art will appreciate that the various modules and components depicted in FIG. 3 are merely exemplary in nature and do not necessarily depict any specific embodiment of the invention.

FIG. 3 includes a data processing system 300 operatively connected to a software development kit (SDK) 305, block storage 310, and Ethernet 375. In one or more embodiments, SDK 305 may reside within DPS 300, or may be stored locally within a same computing device, or may be stored across a network in network storage. Block storage 310 includes physical storage devices connected directly to DPS. Block storage 310 may include any kind of computer storage device, volatile or non-volatile, such as a hard disk, an optical drive such as a compact disk drive or digital video disk (DVD) drive, a flash memory drive, or any combination thereof.

DPS 300 includes a user space 315 and a kernel 320. User space 315 includes various virtual machines, such as virtual machine A 325 and virtual machine B 330. Kernel 320 includes hypervisor 345, file system 350, and physical block device driver 355. Hypervisor 345 provides a virtual abstraction of physical resources for DPS 300, such as block storage 310. These virtual abstractions are implemented as virtual machine A 325 and virtual machine B 330. File system 350 stores and organizes computer files for DPS 300 in a storage system to aid in access and retrieval of system data. Physical block device driver 355 manages data for block storage 310.

Hypervisor 345 includes a virtual block device driver 360 and an I/O engine 365. Virtual block device driver 360 is a virtual abstraction of physical block device driver 355. Virtual block device driver 360 manages data for storage from virtual machine A 325 and virtual machine B 330. Virtual block device driver 360 is communicably connected to virtual machine A 325 and virtual machine B.

Hypervisor 345 also includes an I/O engine 365. I/O engine 365 manages virtual network data connections between virtual machine A 325 and virtual machine B 330. I/O engine 365 includes a customizable networking module 370. In one or more embodiments, customizable networking module 370 causes the data plane to process packets differently than it would prior to loading customized networking module. Said another way, the networking behavior of the virtual machines in user space 315 may differ based on the customizable networking module 370. According to one or more embodiments, customizable networking module 370 may be generated by a developer utilizing SDK 305.

Figure 4:
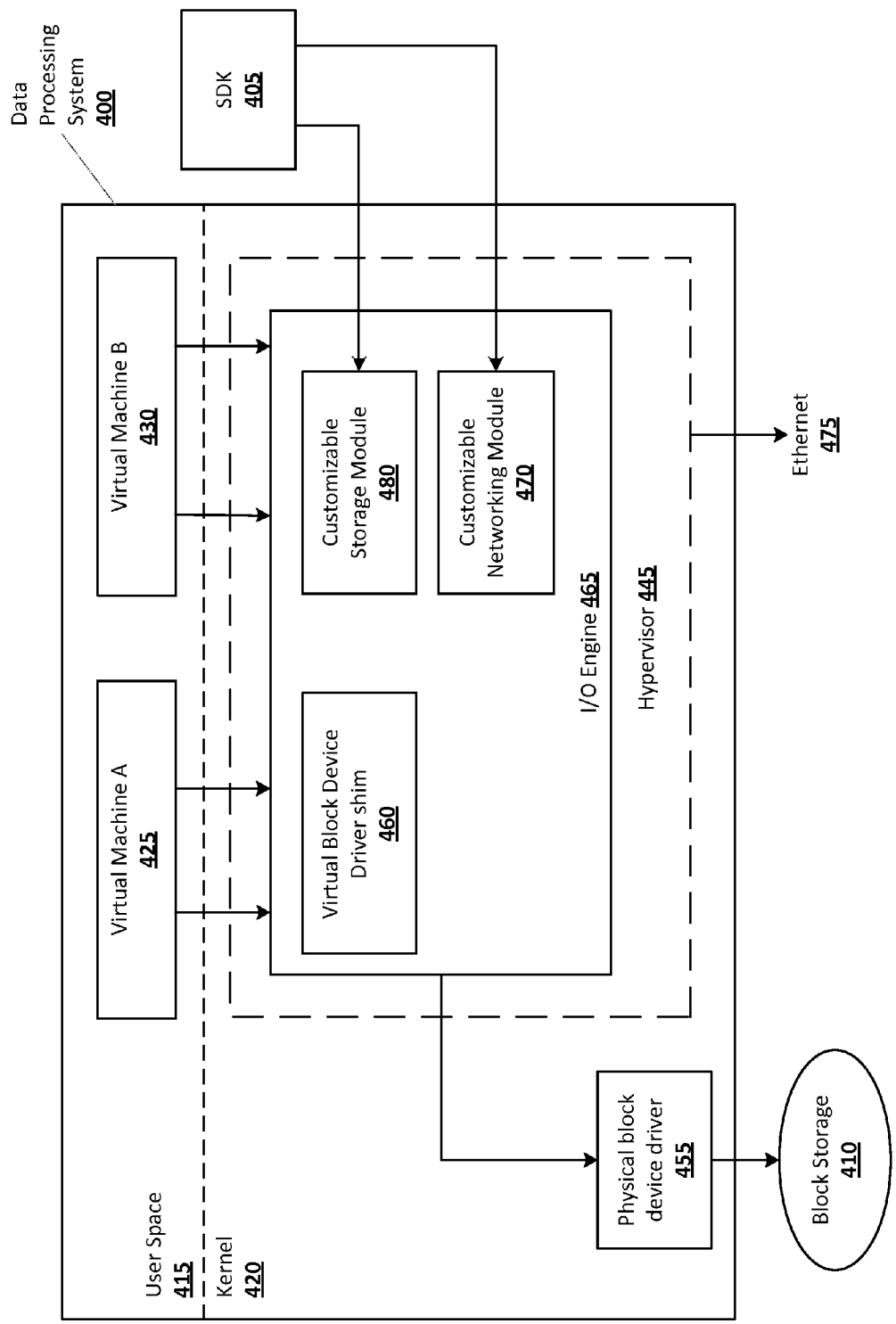
FIG. 4 shows a data processing system in which the invention may be practiced, according to one or more embodiments.

FIG. 4 shows a data processing system in which the invention may be practiced, according to one or more embodiments. Specifically, FIG. 4 depicts a system for implementing customizable storage in a virtual network. Those skilled in the art will appreciate that the various modules and components depicted in FIG. 4 are merely exemplary in nature and do not necessarily depict any specific embodiment of the invention.

FIG. 4 includes a data processing system 400 operatively connected to a software development kit (SDK) 405, block storage 410, and Ethernet 475. In one or more embodiments, SDK 405 may reside within DPS 400, or may be stored locally within a same computing device, or may be stored across a network in network storage. Block storage 410 includes physical storage devices connected directly to DPS 400 that may or may not be present. Block storage 410 may include any kind of computer storage device, volatile or non-volatile, such as a hard disk, an optical drive such as a compact disk drive or digital video disk (DVD) drive, a flash memory drive, or any combination thereof.

DPS 400 includes a user space 415 and a kernel 420. User space 415 includes various virtual machines, such as virtual machine A 425 and virtual machine B 430. Kernel 420 includes hypervisor 445 and physical block device driver 355. Hypervisor 445 provides a virtual abstraction of physical resources available to DPS 400, such as block storage 410. These virtual abstractions are implemented as virtual machine A 425 and virtual machine B 430. Optional physical block device driver 455 manages data for block storage 410 if it present.

Hypervisor 445 includes a container, such as I/O engine 465. As depicted, I/O engine 465 includes a virtual block device driver shim 460, a customizable networking module 470, and a customizable storage module 480. I/O engine 465 manages virtual network data connections between virtual machine A 425 and virtual machine B 430.

Virtual block device driver shim 460 is a block device abstraction for virtual machine A 425 and virtual machine B 430. Virtual block device driver shim 460 manages storage read/write requests to and from virtual machine A 425 and virtual machine B 430. Virtual block device driver shim 460 is an interfacing layer between virtual machine A 425 and virtual machine B 430 and customizable storage module 480. Virtual block device driver 360 in FIG. 3 is a full fledged driver that takes virtual block IO requests from virtual machines and translates them to corresponding physical IO requests to File System 350. Whereas virtual block device driver shim 460 only parses block IO requests from virtual machines and allows for customizable storage module 480 to perform functions typically performed by virtual block device driver 360. This functionality can include cashing, deduplication, encryption and transfer over the network through the customizable networking module 470. Furthermore, customizable storage module 480 may interact with customizable networking module 470 and vice versa to allow the developer of both modules to implement storage manipulating algorithms that rely on networking functions and to have network packet processing algorithms that rely on local storage for advanced logic. Like storing certain types of packets to a local disk or to retrieving stored block via sending packet to remote destination.

In one or more embodiments, customizable storage module 480 processes block I/O read/write requests differently than it would prior to loading customized storage module 480. Said another way, the view of storage for the virtual machines in user space 415 may differ based on the customizable storage module 470. According to one or more embodiments, customizable storage module 480 may be generated by a developer utilizing SDK 405.

Figure 5:
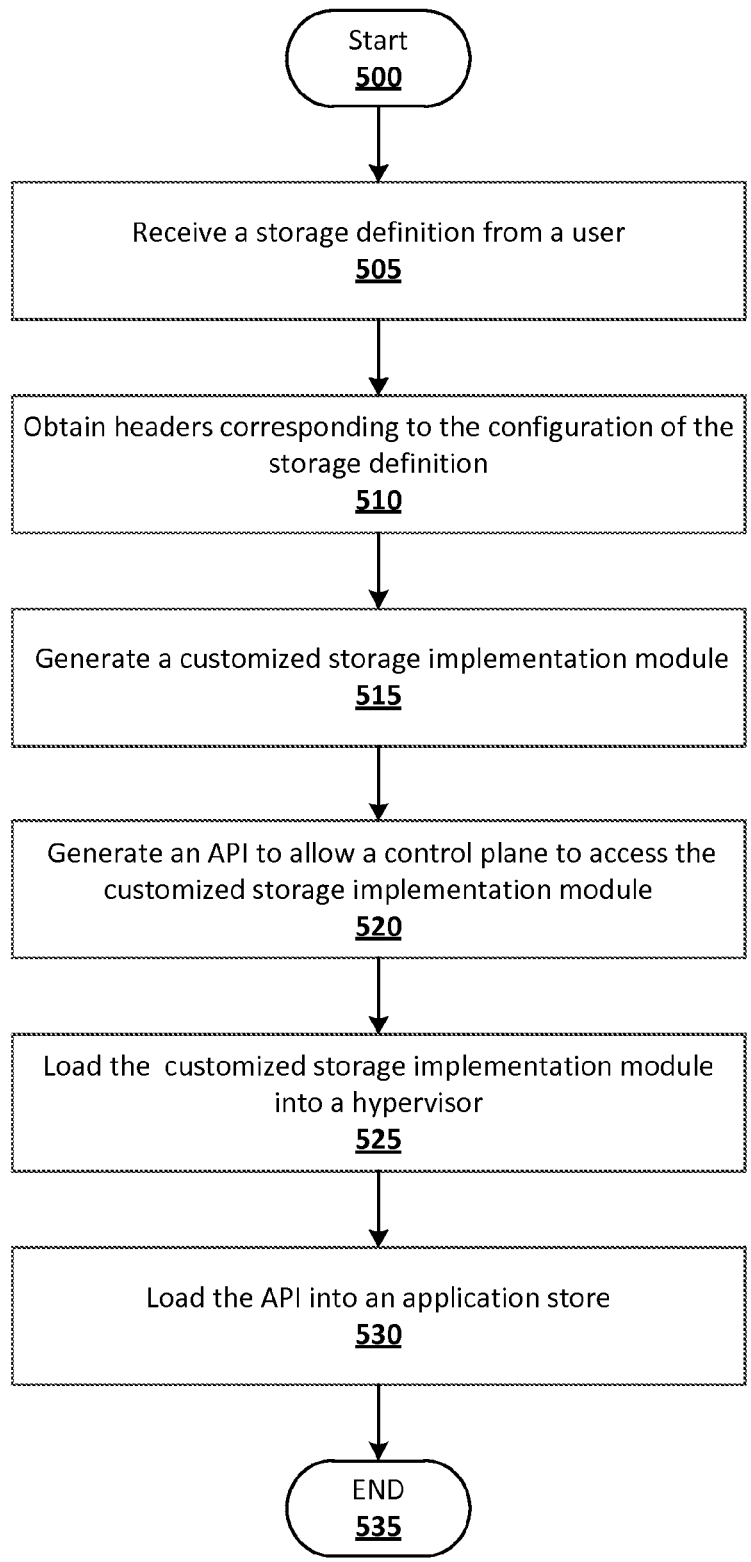
FIG. 5 shows a flow chart depicting a method for generating a data plane for a network storage application according to one or more embodiments.
Figure 6:
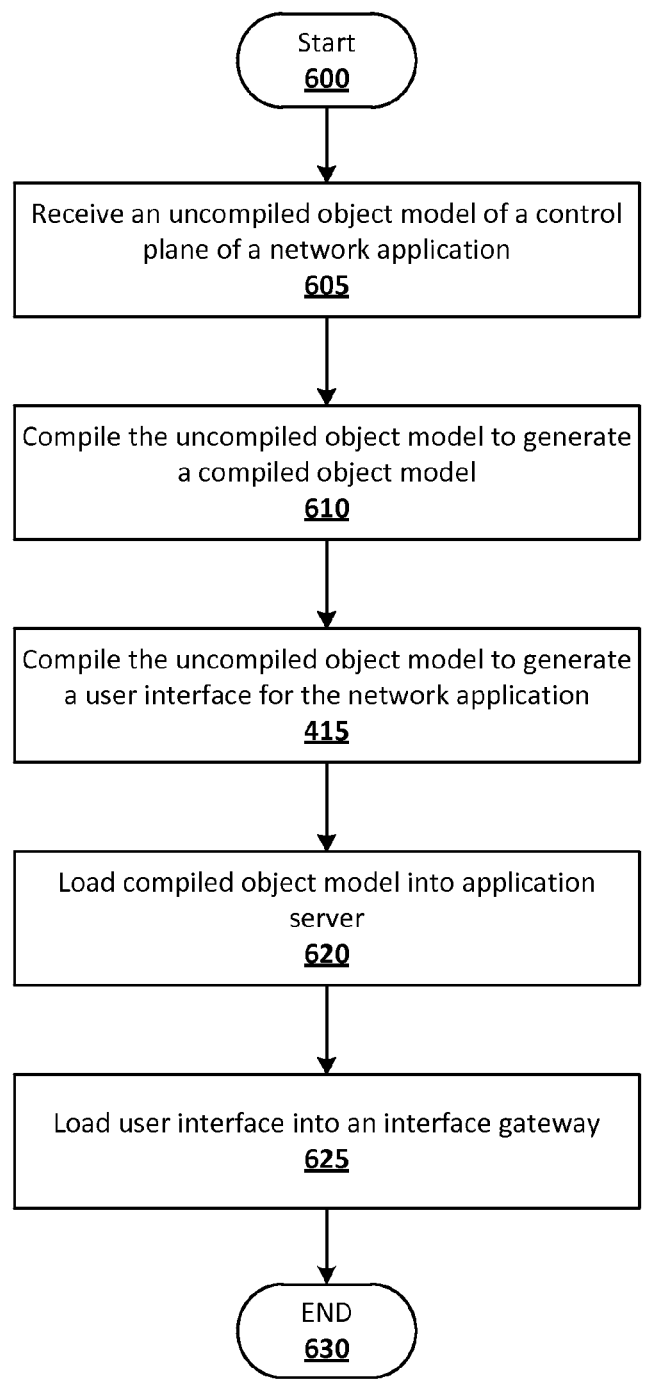
FIG. 6 shows a flow chart depicting a method for generating a control plane for a network storage application according to one or more embodiments.
Figure 7:
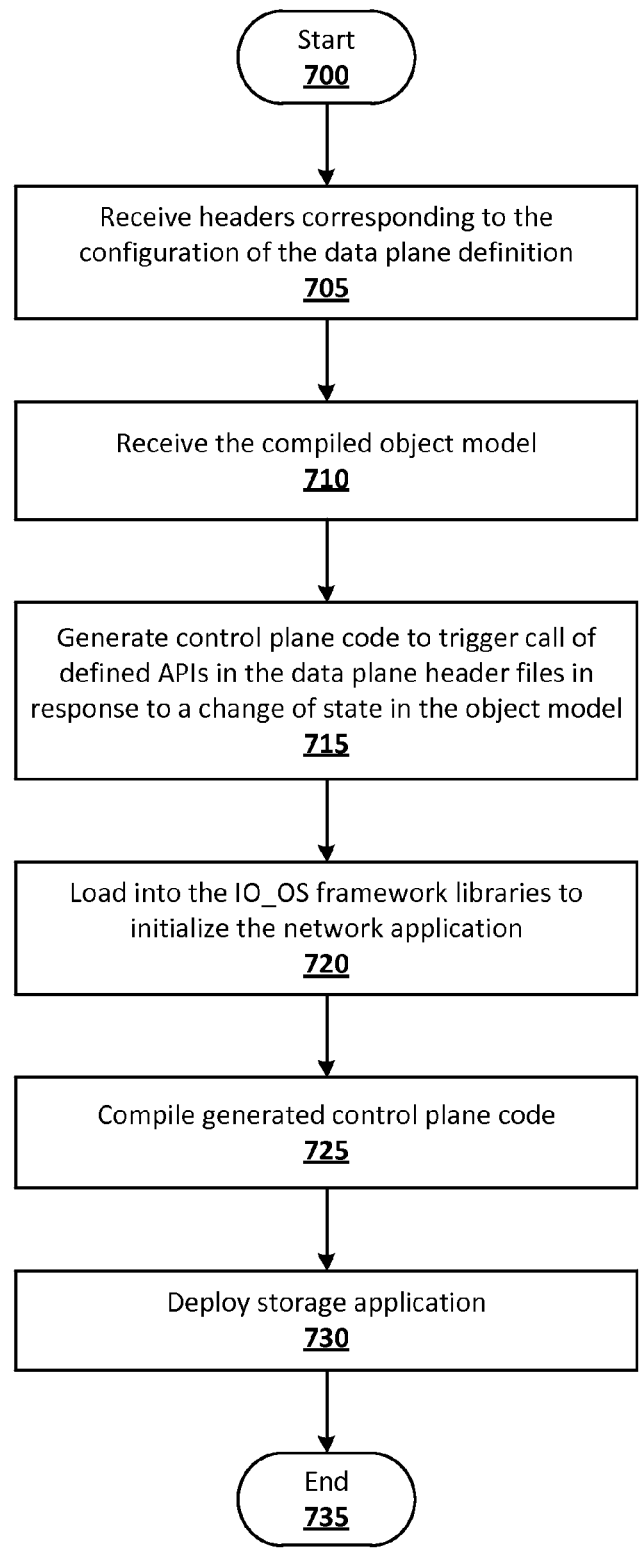
FIG. 7 shows a flow chart depicting a method for deploying a network storage application, according to one or more embodiment.

FIGS. 5-7 depict various flow charts illustrating various aspects of the disclosure. Each of the flowcharts includes various steps depicted in a particular order, although in one or more embodiments the various steps may be performed in a different order, or perhaps simultaneously. For purposes of clarify, citation will be made to FIG. 2. However, any indication that a particular step is performed by a particular module depicted in FIG. 2 is merely for exemplary purposes and is not necessarily intended to limit the scope of the disclosure.

FIG. 5 shows a flow chart depicting a method for generating a customizable storage implementation module for a network application according to one or more embodiments. The method begins at block 500. At block 505, a storage compiler receives a storage definition from a developer. In one or more embodiments, the storage definition is written in a domain specific language. The storage definition describes a customized functionality of network storage for a storage application. According to one or more embodiments, the storage definition provides a customized functionality of the data plane. Said another way, a data plane of a storage application will cause block I/O requests to be processed differently based on the storage definition.

At block 510, the storage compiler obtains header files corresponding to the configuration of the data plane definition. In one or more embodiments, header files are stored in a header file store that may be a database or any other data structure configured to store header files. In one or more embodiments, the storage compiler references the header file store to determine how to compile the storage definition. At block 515, the storage compiler generates a set of customized storage implementation modules, and at block 520, the storage compiler generates an API to allow a control plane of the storage application to access the set of customized storage implementation modules generated at block 515. In one or more embodiments, the API is generated when a customized data processing module is generated.

The method continues at block 525, and the storage compiler, with the help of the IO_OS, loads the generated set of customized data processing modules into a data plane container, such as an I/O engine. At block 530, the storage compiler loads the generated API into the application store. The method ends at block 535.

FIG. 6 depicts a flow chart depicting a method for compilation of a control plane object model, according to one or more embodiments of the invention.

The method begins at block 600. At block 605, a control plane object model compiler (CPOM compiler) receives an uncompiled object model of a control plane of a network application. In one or more embodiments, the object model is received in a domain specific language.

At block 610, the CPOM compiler compiles the uncompiled object model to generate a compiled object model. At block 615, and the CPOM compiler compiles the uncompiled object model to generate a program interface that allows a user or module to communicate with the control plane of the storage application.

The method continues at block 620, and the CPOM compiler loads the object model into an application server 620. In one or more embodiments, the CPOM compiler may load the object model into the same or similar location as the location of a corresponding API of the storage application, as described with respect to FIG. 5. The method continues at block 625, and the CPOM compiler loads the program interface into an interface gateway with the help of the IO_OS. The method ends at block 630.

FIG. 7 shows a flow chart depicting a method for deploying a network application, according to one or more embodiment. The method begins at block 700. At block 705, SDK 400 receives hearers corresponding to the configuration of the data plane definition. In one or more embodiments, SDK 400 includes functionality to determine a particular configuration and retrieve the corresponding header files from a data store. At 710, SDK 400 receives (or generates) the compiled version of the control plane object model 415.

At block 715, SDK 400 generates control plane code to trigger a call of defined API's in the data plane header files in response to a change of state in the object model.

At block 720, SDK 400 loads libraries into the IO_OS framework 320 to initialize the network application. At block 725, SDK 400 compiles the generated control plane code, and at block 730, SDK 200 deploys the storage application. The method ends at block 735.

In each of the flow charts described above, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

Figure 8:
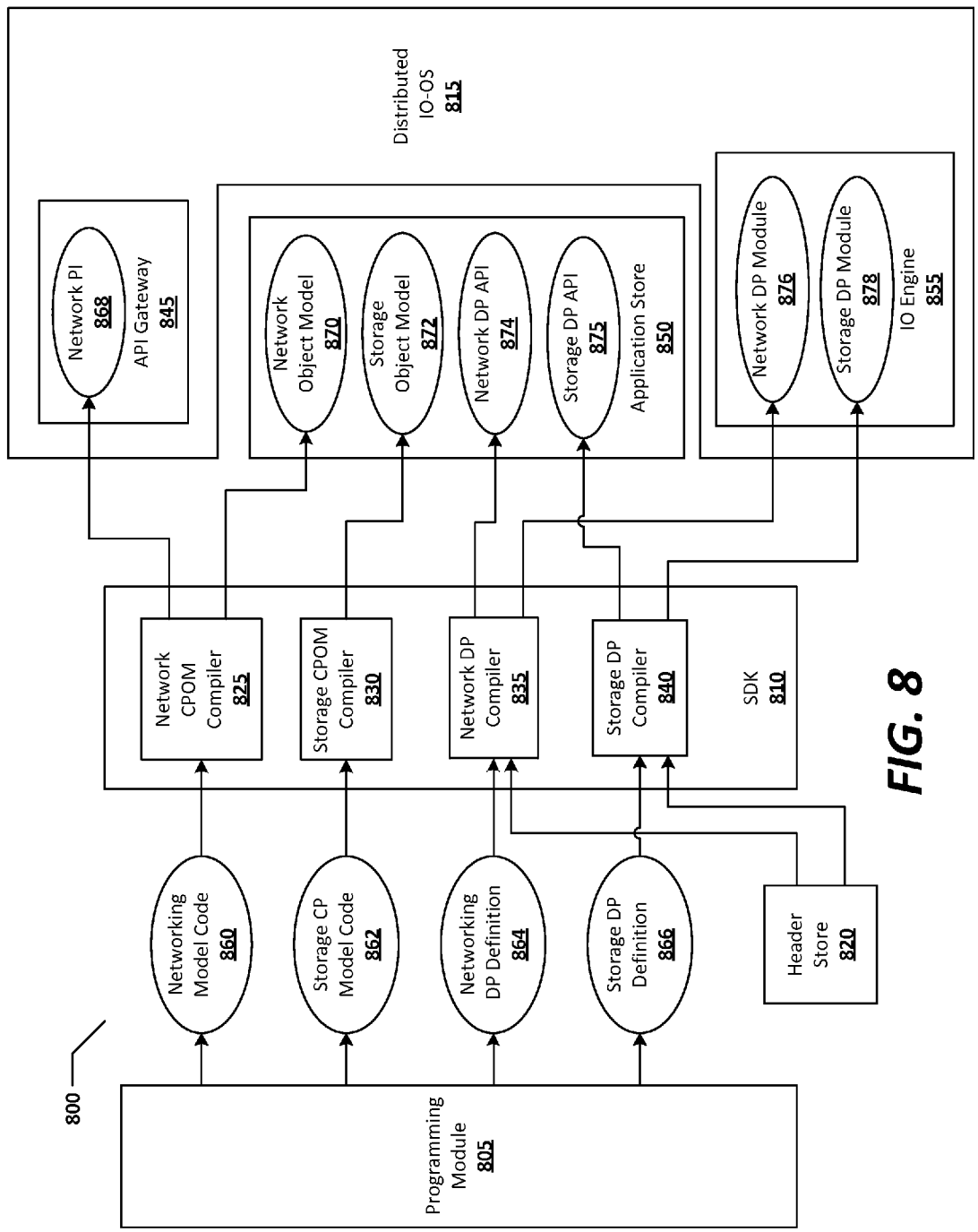
FIG. 8 depicts an example flow diagram for compilation of a data plane definition language, according to one or more embodiments of the invention.

FIG. 8 depicts an example flow diagram, according to one or more embodiments of the invention. Specifically, FIG. 8 depicts a flow diagram 800 of the generation and deployment of various customizable networking and storage modules across a distributed IO_OS 815, according to one or more embodiments.

The diagram flow begins with programming module 805 transmitting data to various compilers that are, according to one or more embodiments, located within SDK 810. In one or more embodiments, programming module 805 may be a functional computing component generating the various data, or may be a human user/developer providing the networking DP definition 864 and storage DP definition 866. Specifically, programming module 805 transmits networking object model code 860, storage control plane model code 862, networking data plane definition 864, and storage data plane definition 866 to networking control plane object model (CPOM) compiler 825, storage CPOM compiler 830, networking DP compiler 835, and storage DP compiler 840, respectively.

Upon receiving networking model code 860, network CPOM compiler 825 generates a network programmatic interface 868 and loads the programmatic interface 868 into API gateway 845. According to one or more embodiments, network programmatic interface 868 allows a user or functional module to communicate with the control plane of the network or storage application. Network CPOM compiler 825 also generates a compiled network object model 870, and loads the compiled object model 870 into application store 850. Upon receiving storage CP model code 862, storage CPOM compiler 830 generates a compiled storage object model 872, and loads the compiled object model 872 into application store 850.

Upon receiving networking data plane definition 864, network DP compiler 835 accesses header store 820 to identify the appropriate header file. In one or more embodiments, network DP compiler 835 assesses the configuration of the networking DP definition 864 to determine the appropriate header file. In response to compiling the networking data plane definition 864, network DP compiler 835 generates a networking data plane API 874 and one or more customized network data processing modules 876. In one or more embodiments, the generated network DP API 874 allows communication between the data plane and the control plane for the network application. In one or more embodiment, the customized networking data processing module 876 causes the IO engine 855 of the network application to process packets differently than prior to loading the customized data processing module in the IO engine 855. The networking data processing module 876 may be composed by a single instance or multiple instances. Multiple instances of the customized networking data processing module 876 may be presented as a single instance through a data plane abstraction or as multiple instances at the request of the Network Application developer.

Upon receiving storage data plane definition 866, storage DP compiler 840 accesses header store 820 and generates a customized storage implementation module 878 and generates a storage data plane API 875. In one or more embodiment, the customized storage implementation module 878 causes the IO engine 855 of the storage application to process I/O requests differently than prior to loading the customized storage implementation module 878 in the IO engine 855.

Figure 9:
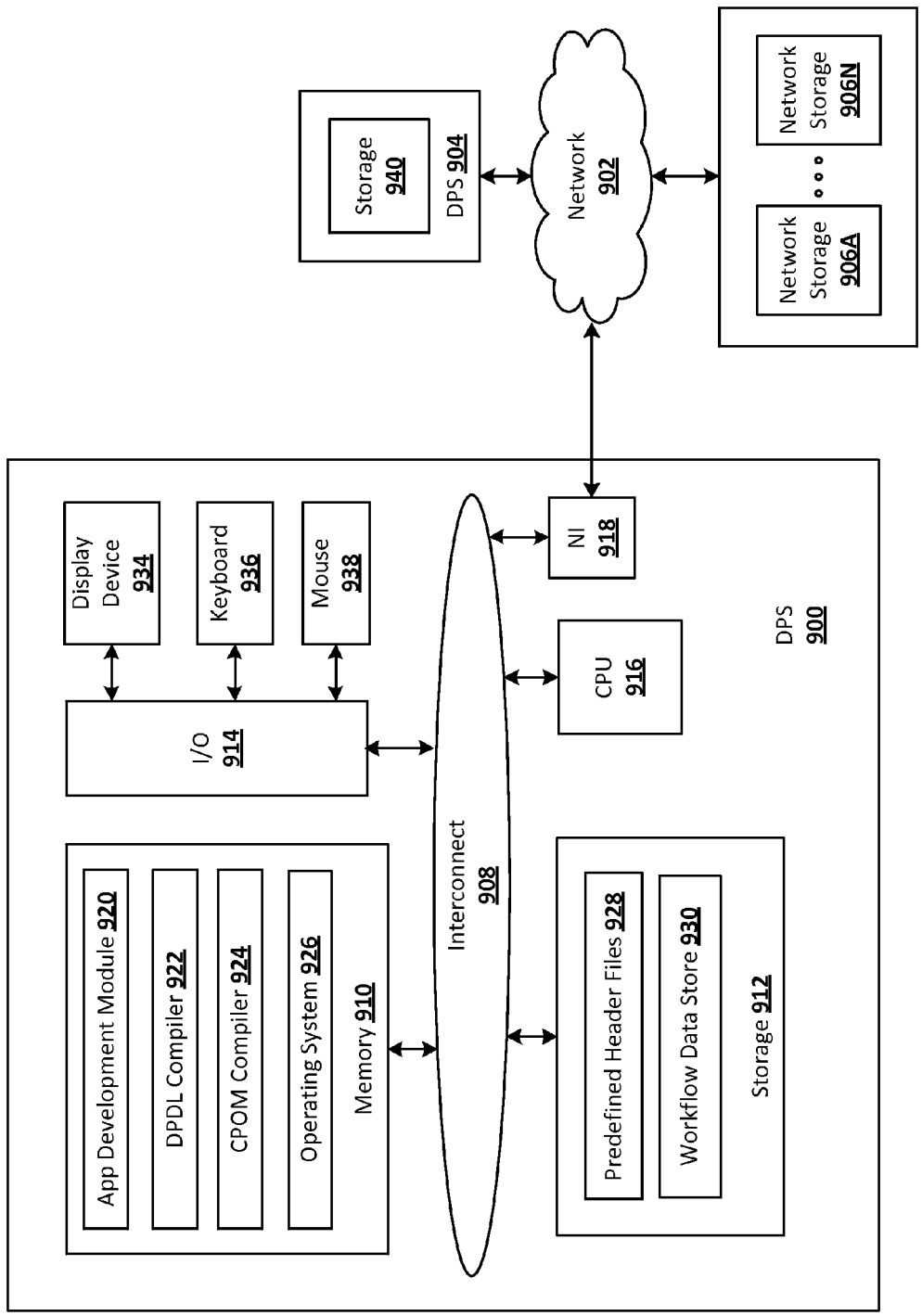
FIG. 9 depicts an example data processing system for a host in the network storage architecture, according to one or more embodiments of the invention.

FIG. 9 depicts an example flow diagram for compilation of a control plane definition language, according to one or more embodiments of the invention. Specifically, FIG. 9 depicts a flow diagram 900 of CPOM compiler 955 receiving object model code 960 from programming module 905 and generating a programming interface 965, and a compiled object model of the control plane of a network application 970.

The flow diagram begins with programming module 805 transmitting the object model code 960 to a CPOM compiler 955 that, according to one or more embodiments of the invention, is located within SDK 910.

Upon receiving object module code 960, CPOM compiler 955 generates a programmatic interface and loads the programmatic interface 965 into API gateway 925. According to one or more embodiments, programmatic interface 965 allows a user or functional module to communicate with the control plane of the network application. CPOM compiler 955 also generates a compiled object model 970, and loads the compiled object model 970 into application store 935.

FIG. 9 depicts an example data processing system for a host in the network architecture, according to one or more embodiments of the invention. Specifically, FIG. 9 depicts an example DPS 900 communicable with another DPS 904, or network storage 906A-906N across a network 902, within which the functional aspects of the described embodiments may advantageously be implemented. In one or more embodiments, a user may develop network applications using DPS 900.

DPS 900 includes numerous components logically connected by Interconnect 908. Specifically, FIG. 9 depicts DPS 900 including Memory 910, central processing unit (CPU) 916 (also interchangeably referred to as a processor), Storage 912, Input/Output (I/O) controller 914, and network interface card (NIC) 918. In addition, FIG. 9 depicts that DPS 900 may be connected via NIC 918 to Network Storage 906A-906N and a second DPS 904 across Network 902.

Those skilled in the art will appreciate that CPU 916 can also be any kind of hardware processor. I/O controller 914 allows a user to interface with DPS 900. As depicted, I/O controller 914 provides an interface for such devices as Display Device 934, Keyboard 936, and Mouse 938. According to one or more embodiments, Display Device 934 may include output means such as a liquid crystal display (LCD), a plasma display, a cathode ray tube (CRT) monitor, or any other kind of display device.

Memory 910 may be random access memory (RAM), cache memory, flash memory, or any other kind of storage structure that is configured to store computer instructions/code executable by CPU 916 and/or data utilized during such execution. As depicted, Memory 910 includes Operating System 926. Operating System 926 may be any platform that manages the execution of computer code and manages hardware resources.

Memory 910 also includes a plurality of functional modules, such as application development module 920, DPDL compiler 922, and CPOM compiler 924. It is appreciated that one or more of these modules can be distributed across network 902.

As depicted, DPS 900 also includes Storage 912. Storage 912 may be any kind of computer storage device, such as a hard disk, an optical drive such as a compact disk drive or digital video disk (DVD) drive, and a flash memory drive. Storage 912 includes predefined header files 928, and workflow data store 930.

Those skilled in the art will appreciate that the software aspects of an illustrative embodiment of the present invention are capable of being distributed as a computer program product in a variety of forms, and that an illustrative embodiment of the present invention applies equally regardless of the particular type of computer-readable storage device used to actually store the software aspects of the invention.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for network storage, the method comprising:
   receiving, by a storage compiler, a first storage definition from a storage application developer; wherein the first storage definition describes a customized storage implementation for storing data in an abstraction of at least one physical storage device;
   compiling the first storage definition to generate a first customized storage implementation module;
   loading the first customized storage implementation module into an IO engine; wherein the first customized storage implementation module causes data to be stored in the at least one physical storage device differently than prior to loading the first customized storage implementation module in the IO engine; and
   in response to receiving a second storage definition:
      dynamically generating a second customized storage implementation module; and
      dynamically loading the second customized storage implementation module into the IO engine;
      wherein an IO operating system prevents a first network storage application associated with the first storage definition from utilizing the second customized storage implementation module.

2. The method of claim 1, wherein a first network storage application and a second network storage application concurrently utilize the IO engine to access the respective customized storage implementation modules.

3. The method of claim 1, wherein the first storage definition is received in a domain specific language.

4. The method of claim 1, wherein the customized storage processing modules are configured to perform configurable functions including hash, encrypt, decrypt, lookup, and data deduplication;
   wherein the configurable function of hash comprises a hash function;
   wherein the configurable function of encrypt comprises a function for encoding data using an encryption algorithm;
   wherein the configurable function of decrypt comprises a function for encoding data using an encryption algorithm; and
   wherein the configurable function of lookup comprises identifying a location for particular data, and the configurable function of deduplication comprises functionality for removing redundant data.

5. The method of claim 1, wherein the IO engine orchestrates an execution order of a first set of customized data processing modules and a second set of customized data processing modules by connecting the individual customized data processing modules according to a configuration policy.

6. The method of claim 1, wherein the customized storage implementation module is composed of multiple instances through the IO engine.

7. A system for network storage, the system comprising a computer readable storage device comprising computer readable code executable by a processor to:
   receive, by a storage compiler, a first storage definition from a storage application developer; wherein the first storage definition describes a customized storage implementation for storing data in an abstraction of at least one physical storage device;
   compile the first storage definition to generate a first customized storage implementation module;
   load the first customized storage implementation module into an IO engine; wherein the first customized storage implementation module causes data to be stored in the at least one physical storage device differently than prior to loading the first customized storage implementation module in the IO engine; and
   in response to receiving a second storage definition:
      dynamically generate a second customized storage implementation module, and
      dynamically load the second customized storage implementation module into the IO engine,
      wherein an IO operating system prevents a first network storage application associated with the first storage definition from utilizing the second customized storage implementation module.

8. The system of claim 7, wherein a first network storage application and a second network storage application concurrently utilize the IO engine to access the respective customized storage implementation modules.

9. The system of claim 7, wherein the first storage definition is received in a domain specific language.

10. The system of claim 7, wherein the customized storage implementation modules are configured to perform configurable functions including hash, encrypt, decrypt, lookup, and data deduplication;
    wherein the configurable function of hash comprises a hash function;
    wherein the configurable function of encrypt comprises a function for encoding data using an encryption algorithm;
    wherein the configurable function of decrypt comprises a function for encoding data using an encryption algorithm;
    wherein the configurable function of lookup comprises identifying a location for particular data, and the configurable function of deduplication comprises functionality for removing redundant data.

11. The system of claim 7, wherein the IO engine orchestrates an execution order of a first set of customized data processing modules and a second set of customized data processing modules by connecting the individual customized data processing modules according to a configuration policy.

12. The system of claim 7, wherein the customized storage implementation module is composed of multiple instances through the IO engine.

13. A computer program product for network storage application development, the computer program product comprising: a computer readable storage device; and computer readable code stored on the computer readable storage device and executable by a computer processor to:
    receive, by a storage compiler, a first storage definition from a storage application developer wherein the first storage definition describes a customized storage implementation for storing data in an abstraction of at least one physical storage device;

compile the first storage definition to generate a first customized storage implementation module;
load the first customized storage implementation module into an IO engine;
wherein the first customized storage implementation module causes data to be stored in the at least one physical storage device differently than prior to loading the first customized storage implementation module in the IO engine; and
in response to receiving a second storage definition:
dynamically generate a second customized storage implementation module; and
dynamically load the second customized storage implementation module into the IO engine;
wherein an IO operating system prevents a first network storage application associated with the first storage definition from utilizing the second customized storage implementation module.

14. The computer program product of claim 13, wherein a first network storage application and a second network storage application concurrently utilize the IO engine to access the respective customized storage implementation modules.

15. The computer program product of claim 13, wherein the first storage definition is received in a domain specific language.

16. The computer program product of claim 13, wherein the customized storage implementation modules are configured to perform configurable functions including hash, encrypt, decrypt, lookup, and data deduplication;
wherein the configurable function of hash comprises a hash function;
wherein the configurable function of encrypt comprises a function for encoding data using an encryption algorithm;
wherein the configurable function of decrypt comprises a function for encoding data using an encryption algorithm;
wherein the configurable function of lookup comprises identifying a location for particular data; and
wherein the configurable function of deduplication comprises functionality for removing redundant data.

17. The computer program product of claim 13, wherein the IO engine orchestrates an execution order of a first set of customized data processing modules and a second set of customized data processing modules by connecting the individual customized data processing modules according to a configuration policy.

* * * * *